United States Patent
Mao

(12) 
(10) Patent No.: US 6,316,379 B1
(45) Date of Patent: Nov. 13, 2001

(54) ZSM-5 ZEOLITE MATERIALS DOPED WITH FLUORINE SPECIES FOR THE SYNTHESIS OF MTBE AND OTHER ACIDO-CATALYZED REACTIONS

(75) Inventor: Raymond Le Van Mao, Saint-Laurent (CA)

(73) Assignee: Concordia University, Montreal (CA)

( * ) Notice: Subject to any disclaimer, the term of this patent is extended or adjusted under 35 U.S.C. 154(b) by 0 days.

(21) Appl. No.: 09/332,443

(22) Filed: Jun. 14, 1999

Related U.S. Application Data

(60) Provisional application No. 60/089,284, filed on Jun. 15, 1998.

(51) Int. Cl.⁷ .............................. B01J 29/06; B01J 29/40
(52) U.S. Cl. ............................... 502/71; 502/64; 502/77; 502/85; 502/86
(58) Field of Search .............................. 502/60, 64, 71, 502/77, 85, 86

(56) References Cited

U.S. PATENT DOCUMENTS

| | | | | |
|---|---|---|---|---|
| 4,596,704 | * | 6/1986 | Miale et al. | 423/328 |
| 4,678,766 | * | 7/1987 | Rosinski | 502/85 |
| 4,753,910 | * | 6/1988 | Han et al. | 502/85 |
| 5,326,923 | * | 7/1994 | Cooper et al. | 585/725 |
| 5,990,031 | * | 11/1999 | Ghosh | 502/66 |

FOREIGN PATENT DOCUMENTS 2046694   1/1993   (CA).

OTHER PUBLICATIONS

F. Ancillotti, M.M. Mauri and E. Pescarollo, J. Catal. 46 (1977), 49.
P. Chu and G.H. Kuhl, Ind. Eng. Chem. Res. 26 (1987), 365.
L.M. Tau and B.H. Davis, Appl. Catal. 53 (1989) 263.
R. Le Van Mao, R. Carli, H. Ahlafi and V. Ragaini, Catal. Lett. 6 (1990), 321.
R. Le Van Mao, H. Ahlafi and T.S. Le, in Selectivity in Catalysis, Ed. by M.E. Davis and S.L. Suib, ACS Symp. Ser. 517, Washington DC (1993), 233.
A. Kogelbauer, A.A. Nikolopoulos, J.G. Goodwin Jr. and G. Marcelin, in Zeolites and Related Microporous Materials: State of the Art 1994, ed. by J. Weitkamp, H.G. Karge, H. Pfeifer and W. Holderich, Elsevier Sc. (1994), p 1685.
A.A. Nikolopoulos, R. Oukaci, J.G. Goodwin Jr., and G. Marcelin, Catal. Lett. 27 (1994) 149.
A.A. Nikolopoulos, A. Kogelbauer, J.G. Goodwin Jr., and G. Marcelin, Catal. Lett. 39 (1996), 173.
R. Le Van Mao, S.T. Le, D. Ohayon, F. Caillibot, L. Gelebart and G. Denes, Zeolites 19 (1997) 270.
C. Doremieux–Morin, A. Ramsaran, R. Le Van Mao, P. Batamack, L. Heeribout, V. Semmer, G. Denes and J. Fraissard, Catal. Lett. 34 (1995), 139.
N.Y. Topsoe, F. Joensen and E.G. Derouane, J. Catal. 110 (1988), 404.
R. Le Van Mao, P. Levesque, G. McLaughlin and L.H. Dao, Appl. Catal. 34 (1987), 163.

\* cited by examiner

*Primary Examiner*—Steven P. Griffin
*Assistant Examiner*—Christina Ildebrando
(74) *Attorney, Agent, or Firm*—Merek & Voorhees

(57) ABSTRACT

Provided herein is are acidic Z5M-5 zeollte materials which are highly active and selective in the synthesis of methyl tert-butyl ether (MTBE) and similar ethers. The materials are obtained by the preparation method comprising the main steps of: i) impregnation of zeolites with fluorine species using ammonium fluoride as precursor, preferably with a F loading of ca.$1.9 \times 10^3$ mol.$g^{-1}$ of zeolite; and ii) stepwise activation in air at preferably 250° C. and then preferably at 300° C. to 500° C., preferably 450° C. The method is preferably applied to desilicated ZSM-5 zeolite and provides conversion rates to MTBE superior to those obtained with prior art commercial AMBERLYSF™ resin (gas phase reaction at 70–80° C.) is obtained. No by-products, commonly produced by prior art commercial organic resin catalyst, are detected in the product spectrum.

9 Claims, 2 Drawing Sheets

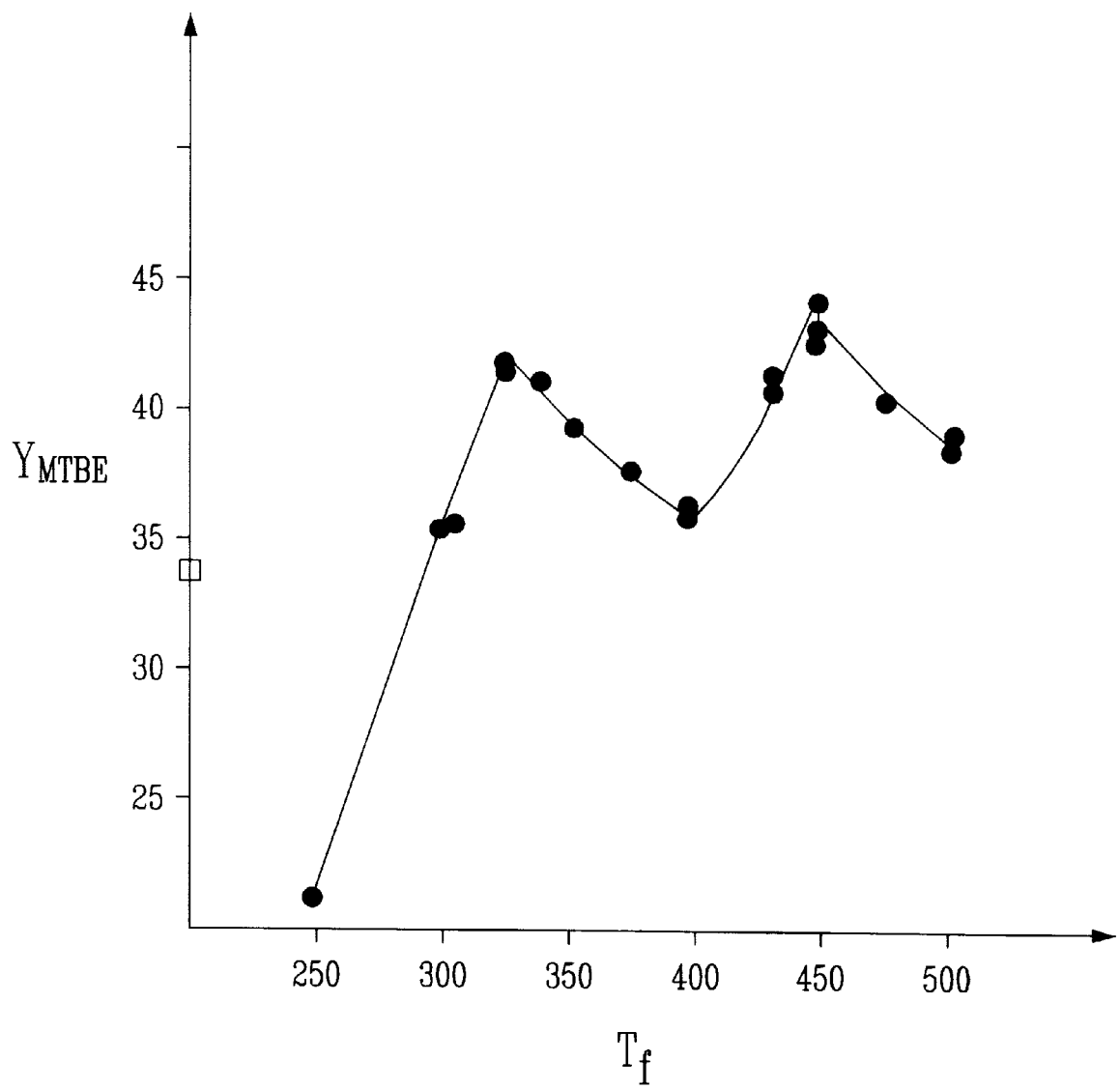
FIG_1

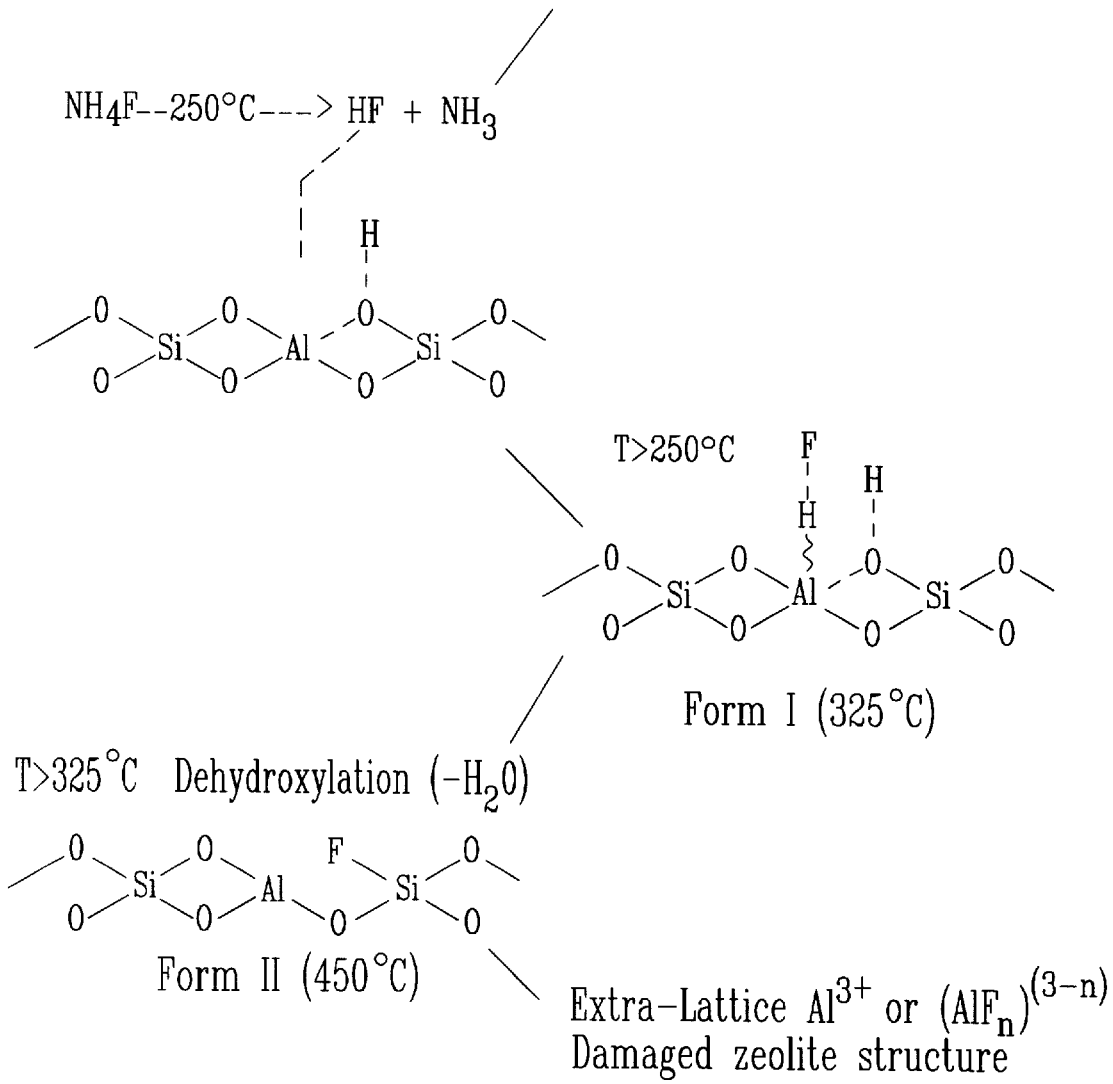
FIG_2

ZSM-5 ZEOLITE MATERIALS DOPED WITH FLUORINE SPECIES FOR THE SYNTHESIS OF MTBE AND OTHER ACIDO-CATALYZED REACTIONS

This application claims the benefit of U.S. Provisional Application No. 60/089,284 filed Jun. 15, 1998.

BACKGROUND OF THE INVENTION

1. Field of the Invention

The present invention relates to ZSM-5 zeolite catalyst material for use in the synthesis of MTBE and similar ethers. More specifically, the invention relates to ZSM-5 zeolite materials doped with fluorine species and properly activated at high temperatures. The present invention also relates to a method of preparing such catalysts.

2. Description of the Prior Art

MTBE (methyl-tert-butyl ether) is currently used as antiknock additive in gasoline. MTBE is synthesized industrially from methanol and isobutene. In industrial operations this synthesis is performed over an acidic ion-exchange resin [1]. The currently commercially successful acidic ionexchange resin is sold under the brand name AMBERLYST 15™ by Aldrich Chemicals and is in fact an organic macrorelicular cation-exchange resin.

Although AMBERLYST 15™ brand resin is efficient in terms of MTHE yield, It suffers from several drawbacks including thermal and chemical instability and the production of deleterious byproducts such as oligomers of isobutens including diisobutenes.

ZSM-5 zeolite was proposed as suitable catalyst material for industrial MTBE synthesis [2]. Indeed, ZSM-5 zeolite catalysts are stable and have a shape-selective pore network which suppresses by-product generation during MTBE synthesis [4,8]. By-product generation of oligomers of isobutene such as diisobutenes is deleterious to MTBE production [4].

However, the ZSM-5 zeolite showed inferior activity and MTBE synthesis yields when compared to AMBERLYST ™ brand resin (under normal conditions of gas phase synthesis of MTBE with temperature of about 70 to 90° C. and methanol/isobutene ratio of about 1:1) [3,4].

To improve MTHE synthesis yields, it was proposed to increase the surface acidity of the zeolite material by coating it with triflic acid. This required that the zeolite pore size was made sufficiently large to accommodate significant amounts of triflic acid (Y-type zeolite) [4–6]. However, this negatively impacted on unique qualities of zeolite material such as its shape selectivity, It has also been suggested to incorporate fluorine (F) species as electron-withdrawing species to enhance catalyst surface acidity [7]. However, as pointed out later by Nikolopoulos et al [9], "fluoride modification did not result in an MTBE synthesis activity enhancement unless it was coupled with a high temperature activation process". Despite this general statement, the all authors failed in devising a procedure for the preparation of a high performance ZSM-5 catalyst for high yield synthesis of MTRE Indeed, the studies relating to the present invention show that a catalyst activation temperature of 400° C. [ref.7] provided low yields of MTBE synthesis.

Thus, the prior art has so far failed to provide ZSM-5 catalysts capable of effectively competing in the marketplace with resin type catalysts such as AMBERLYST 15™ brand resin.

It is therefore an object of the present invention to provide a novel ZSM-5 catalyst and preparation method which results in an increase of the surface acidity of ZSM-5 zeolite catalyst. The novel catalyst must also provide high MTSE production yields without significantly modifying pore characteristics of the ZSM-5 zeolite catalyst in order to preserve its unique shape selectivity and minimize by-product generation.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

In general terms, the present invention provides a method of conditioning a ZSM-5 zeolite catalyst material for use in the synthesis of MTBE, analogous ethers, and other acido-catalyzed reactions conducted at temperatures of less than about 450° C., the method comprising the steps of: (i) impregnation of aqueous solution of ammonium fluoride into said parent ZSM-5 zeolite or desilicated ZSM-5 zeolite; ii) drying the resulting material; (iii) activating the resulting material at about 250° C.; and (iv) activating the resulting material at about 300 to about 500° C., overnight and preferably about 325 or about 450° C., overnight.

Preferably, step (ii) is performed at about 120° C. and until constant weight, step (iii) is performed for a period of time of about 3 to about 5 hours and step (iv) is performed for a period of time of about 8 to about 24 hours.

The invention also provides a novel and useful ZSM-5 zeolite material obtained from the method of the invention.

BRIEF DESCRIPTION OF THE DRAWINGS

FIG. 1 illustrates the MTBE yield ($Y_{MTBE}$, in C atom %) of the H-ZSM5/F3 catalyst versus the final activation temperature ($T_f$, in ° C.);

FIG. 2 illustrates the mechanism of formation of active sites as a function of the activation temperature ($T_f$)

DETAILED DESCRIPTION OF A PREFERRED EMBODIMENT OF THE INVENTION

Before describing the present invention in detail, it is to be understood that the invention is not limited in its application to the details of method steps and process conditions described herein. The invention is capable of other embodiments and of being practiced in various ways. It is also to be understood that the phraseology or terminology used herein is for the purpose of description and not limitation.

This invention provides ZSM-5 zeolite materials doped with fluorine species and properly activated at high temperatures. The invention also provides a method of preparing the catalyts of the invention.

The term "ZSM-5 zeolite materials" is to be understood to encompass any such material known to those skilled in the art. Without restricting the foregoing, are envisaged any zeolite catalyst material are selected from the group of zeolite catalyst materials consisting of: microporous atuminosilicates, microporous silicoaluminophosphates and mesoporous silica-containing materials. Also envisaged and even preferred are desilicated zeolite materials.

Desilicated ZSM5 zeolite material is preferred since desilication creates surface defects which help anchor the F species during F loading [10]. Furthermore, the concentration of acid sites (per mass or surface area unit) is increased [11].

The ZSM-5 zeolite materials of the present invention are highly active for the synthesis of methyl tert-butylether (MTBE from isobutene (or isobutanol) and methanol. In addition, the zeolite pore network shows a product shape-selectivity unseen in commercial catalysts (organic ion exchange resins such as AMBERLYST 15™) do not have: the formation of by-products (mainly, oligomers of isobutene) is essentially suppressed.

Catalyst Conditioning Method i) The acid form of an H-ZSM5 was prepared by repeated ion exchange of the commercially available Na-ZSM5 zeolite (ZEOCAT PZ 2/30™ brand, powder sodium form, Chemie Uetikon, Switzerland) with a 10 wt % solution of ammonium chloride at 80° C. with stirring. Each treatment lasted for 1 hour, after which the spent solution was decanted and fresh solution was added (1 g of zeolite in 10 ml solution). The procedure was repeated 4 to 5 times, after which the solid was washed on the filter several times with water and dried at 120° C. The acid form was generated by activation at 450° C., in air, overnight. The final catalyst (extrudates), hereafter referred to as H-ZSM5, was obtained by extrusion with bentonite (10 wt %), then drying at preferably 120° C., until preferably constant weight, and finally activating, preferably in air at about 450° C., preferably overnight.

ii) Desilicated Na-DZSM5 was obtained by treating Na-ZSM5 (as described above) with a basic aqueous solution of 0.8 M sodium carbonate containing 0.1 M sodium hydroxide (1 g/20 ml) for 4 h at 80° C. under mild stirring. The mixture was allowed to settle, then the supernatant was decanted and a fresh solution of $Na_2CO_3$/NaOH was added. This procedure was repeated twice. The solid was then filtered and washed on the filter several times with boiling water. The desilicated Na-D-ZSM5 zeolite was then dried, preferably at about 120° C., preferably to constant weight. The acid form was obtained by repeated ion exchange with an aqueous solution of ammonium chloride as described above. The final catalyst, hereafter referred to as H-DZSM5, was prepared by extrusion with bentonite and then activating in the same way as for the H-ZSM5.

iii) The fluoride (F) loading into the H-ZSM5 and H-DZSM5 zeolites was carried out as follows: 10 g of zeolite extrudates (H-ZSM5 or H-DZM5) were impregnated with 17 ml of an aqueous solution of $NH_4F$ (Aldrich Chemicals), in accordance with the incipient wetness technique. The concentration of F of such solutions varied from $0.05 \times 10^{-3}$ to $3.10 \times 10^{-3}$ mol.$g^{-1}$.

After drying at preferably 120° C., preferably to constant weight, the catalyst extrudates were activated stepwise in air at preferably about 250° C. for about 3 to about 5 hours and at $T_f$ for another 4 to about 24 hours, $T_f$ being the temperature of final activation ranging from 300° C. to 500° C.

iv) The AMBERLYST 15™ brand resin, purchased from Aldrich Chemicals, was used as a reference catalyst without any further treatment.

Zeolite Characterization

Untreated zeolite samples (powders) were first characterized by atomic absorption spectrometry (chemical composition: Si, Al, Na). X-ray powder diffraction was used for structural identification and determination of the relative crystallinity (RC) (assuming, unless otherwise specified and only for convenience, that the commercially available Na-ZSM5 zeolite is 100% crystalline).

The determination of the relative crystallinity value (RC) was based on the area under the pattern of the characteristic peaks in 2 (2 theta) ranges of 22.5° to 25.0°. X-ray diffraction was carried out on a Phillips PW 1050/25™ diffractometer, automated with the SIE RAY 112™ system from Sietronics, using zero background holders.

BET total and micropore surface areas were determined by nitrogen adsorption/desorption, using a MICROMETERS ASAP 2000™ apparatus.

FT-IR (Fourier transform infrared) spectra (using a NICOLET MAGNA 500™ infrared spectrometer, resolution 2 $cm^{-1}$) were recorded in the 400–4,000 $cm^{-1}$ region using the transmission mode (wafers of zeolite/KBr=ca. 0.020 g). In particular, the nature of the surface acid sites was investigated by chemical adsorption of pyridine onto the clean self-bonded zeolite wafers after an outgassing under vacuum ($10^{-2}$ mBar) at 180° C. for 4 hours. The bands at 1,547 $cm^{-1}$, 1,446 $cm^{-1}$ and 1,491 $cm^{-1}$ were assigned to the pyridine adsorbed on the Bronsted acid sites (B), the Lewis acid sites (L) and on both acid sites (B,L), respectively [12].

Ammonia adsorption and temperature-programmed desorption (TPD) technique were used for the study of the surface acidity. To avoid physisorption phenomena, ammonia was adsorbed at 100° C. In particular, the measurement of the acid density was carried out during the ammonia TPD experiments by using a 0.02 N HCl solution which was then back-titrated with a 0.05 N NaOH solution. The molar ratio $R_{ac}$/Al was defined as the ratio of the number of moles of the acid sites to that of the Al atoms of the zeolite material.

The nuclear magnetic resonance (NMR) spectra of the zeolite materials were obtained on a Varian VXR 300™ FT-NMR spectrometer operating at 78.159 Mhz (for $^{27}Al$) using superconducting solenoid magnets and amplifiers for final radio frequency pulse generation. A VRX 4000™ model computer system was used for data acquisition and processing. $^{27}Al$ magic angle spinning (MAS)-NMR spectra were obtained using probes with a spinning rate of 10 Hz. $^{27}Al$ chemical shifts were referenced with $[Al(H_2O)_6]^{3+}$.

The F content of the zeolite materials was determined by means of a selective $F^-$ ion electrode used with a total ionic strength adjuster (TISAB II™ from Orion), Methanol adsorption was carried out by first outgassing the zeolite material under vacuum ($10^{-2}$ mBar) at 230° C. for 4 hours and then sorbing ethanol vapors at 80° C. for several days.

Tables 1 and 2 report some physicohemical properties and pore characteristics of the untreated and F loaded zeolites, respectively.

TABLE 1

Physico-chemical properties of the untreated zeolites (powder form, activated at 450° C., overnight)

| Sample | Si/Al (atom ratio) | RC (%) | BET surface area (m²/g) Total | BET surface area (m²/g) Micropores Only |
|---|---|---|---|---|
| Na-ZSM5 | 20.5 | 100 | 332 | 254 |
| H-ZSM5 | 21.0 | 93 | 364 | 267 |
| H-DZSM5 | 15.0 | 86(*) | 389 | 232 |

(*)-92% when compared to the parent zeolite in acid form (H-ZSM5)

TABLE 2

Physico-chemical properties of the F treated ZSM-5 and desilicated ZSM-5 zeolites (extrudates with 10 wt % of bentonite, all activated at 450° C. unless otherwise specified)

| Sample | Initial NH$_4$F loading (10$^{-3}$ mol · g$^{-1}$) | RC (%) | BET surface area (m²/g) Total | BET surface area (m²/g) Micropores only |
|---|---|---|---|---|
| HZSM-5 | 0 | 100 | 328 | 238 |
| H-ZSM5/F7 | 0.05 | 100 | 336 | 266 |
| H-ZSM5/F4 | 1.00 | 100 | 336 | 248 |
| H-ZSM5/F3 | 1.87 | 100 | 333 | 241 |
| H-ZSM5/F5 | 2.60 | 99 | 313 | 224 |
| H-ZSM5/F6 | 3.10 | 88 | 314 | 207 |
| H-ZSM5/F6* | 3.10 | 87 | 313 | 196 |
| H-DZSM5 | 0 | 92 | 361 | 218 |
| H-DZSM5/F3 | 1.87 | 92 | 352 | 223 |

*activated at 500° C. overnight

Catalyst Testing

The experimental set-up was identical to that used for the dehydration of ethanol [13]. The reaction parameters were the following: weight of catalyst: 3.0 g; molar ratio (methanol/isobutene)=1.0; contact time (grams of catalyst per grams of methanol injected per hour)–2.0 h; nitrogen used as carrier gas=10 ml/h; temperature=80° C. (unless otherwise specified), The testing and analysis procedures were standard methods described in [4 and 5].

The product yield ($Y_p$) was calculated as follows:

$$Y_p \text{ (C atom \%)} = (NC_i/NC_f) \times 100$$

where $NC_i$ and $NC_f$ are the numbers of carbon atoms of product p and of feed isobutene, respectively.

Examples

In FIG. 1, the variation of the MTBE yield versus the final temperature of activation of the H-ZSM5/F3 catalyst is shown. There were two maxima which corresponded to two different temperatures of final activation ($T_f$): 325° C. and 450° C., respectively. The second maximum (maximum II), observed at 450° C., was significantly higher than for maximum I (325° C.).

By varying the ammonium fluoride loading (Table 3 shown below), the following results were obtained:

i) except for the lowest and the highest ammonium fluoride loadings, there were two maxima of the MTBE yield obtained at the final activation temperatures of 325° C. and 450° C., respectively, ii) the highest maximum yield of MTBE reported at 450° C. was obtained with a NH$_4$F loading within the range of 1.0×10$^{-3}$ to 2.6×10$^{-3}$ mol.g$^{-1}$. With such values of F loading and activation temperature, there was no significant change in terms of RC and surface area for micropores (Table 2). In addition, there was no noticeable amount of extra-framework Al formed with the H-ZSM5/F3 sample whereas the $^{27}$Al MAS-NMR of the H-ZSM5/F6 (higher loading of F) showed a significant band corresponding to the chemical shift of octahedral Al atoms. This means that the zeolite framework and the surface areas associated with the zeolite micropores of the H-ZSM5/F3 sample were not significantly damaged (dealumination effect) by the corrosive species (HF) generated by the decomposition of NH$_4$F, at 450° C. or 500° C.;

(iii) higher NH$_4$ loading (case of the H-ZSM5/F6 with a F loading of 3.1 10$^{-3}$ mol.g$^{-1}$) resulted in lower MTBE yields (Table 3) because of some partial collapse of the ZSM-5 zeolite structure as evidenced by X-ray diffraction patterns (significant decrease of RC values) and micropore surface areas (significant loss of surface areas corresponding to the micropores) (Table 2);

a final activation temperature of 400° C., as reported in reference [7] corresponding to a the worst MTBE yield (Table 3). Moreover, if the activation temperature was lower than 300° C., there was no significant activity enhancement (FIG. 1), indicating that: a) NH$_4$F decomposition started only at a temperature higher than 250° C., as shown by TAG/DTA technique, and b) within the temperature range of 250–300° C., gaseous ammonia produced by such a decomposition was not completely evacuated from the zeolite surface: this affected some zeolite acid sites and hence the MTBE yield. In fact, as also shown in FIG. 1, at an activation temperature of 250° C., the MTBE yield was even lower than that of the parent zeolite, suggesting some lowering of the reactant diffusion.

TABLE 3

Variation of MTBE yield with ammonium fluoride loading and final activation temperature

| Catalysts | Initial NH$_4$F loading (10$^{-3}$ mol · g$^{-1)}$ | Final temperature of activation (°0 C.) | MTBE yield (%) |
|---|---|---|---|
| H-ZSM5 | 0 | 450 | 34.2 |
| H-ZSM5/F7 | 0.05 | 325 | 37.6 |
|  |  | 400 | 40.2 |
|  |  | 450 | 38.9 |
|  |  | 500 | 41.4 |
| H-ZSM5/F4 | 1.00 | 325 | 42.8 |
|  |  | 400 | 38.8 |
|  |  | 450 | 43.0 |
|  |  | 500 | 39.7 |
| H-ZSM5/F3 | 1.87 | 325 | 42.9 |
|  |  | 400 | 37.5 |
|  |  | 450 | 44.9 |
|  |  | 500 | 41.2 |
| H-ZSM5/F5 | 2.60 | 325 | 42.5 |
|  |  | 400 | 37.4 |
|  |  | 450 | 44.5 |
|  |  | 500 | 31.2 |
| H-ZSM5/F6 | 3.10 | 325 | 33.3 |
|  |  | 400 | 39.8 |
|  |  | 450 | 40.8 |
|  |  | 500 | 31.1 |

Surprisingly, two maxima in MTBE yield, respectively at 325° C. and 450° C. were observed. This shows that stepwise activation starting at 250° C. and followed by activation at 325° C. or 450° C. is clearly advantageous over prior art techniques.

Stepwise activation provides consistently active catalysts. Whereas direct activation at elevated temperatures creates a brutal temperature change which often destroys the catalyst. In the present invention, it was found that initial activation at about 250° C. followed by activation at higher temperatures of 300 to 500° C., preferably about 325° C. or at least about 450° C. provides a consistently active catalyst with good yield in MTSE or related ether synthesis.

Referring to FIG. 2, a theory as to the reason for the two maxima is now presented. In FIG. 2 there is shown a model of the successive transformations of the H-ZSM5/F3 surface when activated at 4 temperature higher than 300° C.

a) At 325° C., some HF species which had been generated by the decomposition of $NH_4F$, were chemisorbed on the zeolite surface (Form I, FIG. 2). The acidity associated with such species contributed to the enhancement of the catalyst acid density of the H-ZSM5/F3 when compared to the parent zeolite. However, the measurement of the acid sites density by means of ammonia TPD gave a lower value (see Table 4 below). This was due to some HF (in the form of $H_2O \ldots F^-$ ion pairs or simply $H^+ \ldots F^-$) which were chemisorbed on the zeolite pore walls. These species, during the ammonia adsorption phase, recombined with the ammonia molecules to form ammonium fluoride species, preventing thus the access of other ammonia molecules to the acid sites which were located deeply inside the zoolite micropore network. In fact, during the desorption phase of the ammonia, there was formation of a significant layer of ammonium fluoride species on the glass wall of the outlet tube of the reactor. This hindrance effect was also observed with the adsorption of methanol at equilibrium (Table 4). On the other hand, FT-IR absorbance measurements in the low-frequency and framework region of the H-ZSM5/F3 samples, when compared to the parent zeolite, showed that the 1104 $cm^{-1}$ band, assigned to the asymmetric stretching of framework Si—O—Si or Si—O—Al bonds, did not experience any significant frequency shift or decrease in the intensity. This indicates that there was no significant change in the number of these forming framework bonds. Moreover, X-ray diffraction patterns showed no change in the zeolite structure and the relative crystallinity value, RC (Table 2). Nevertheless, these adsorbed ($H^+ \ldots F^-$) ion pairs contributed to some increase of the MTBE yield when compared to the parent zeollte (FIG. 1 and Table 3).

TABLE 4

Results of the measurement of the acid sites density by using the ammonia TPD method (Back-titration)

| SAMPLE | F content (wt %) | Methanol sorption ($10^{-3}$ mol · $g^{-1}$) | Density of acid sites ($10^{-3}$ mol · $g^{-1}$) | $R_{ac/Al}$ |
|---|---|---|---|---|
| H-ZSM5 (450° C.) | 0 | 2.6 | 0.78 | 1.0 |
| H-ZSM5/F3 (325° C.) | 2.4 | 1.9 | 0.70(*) | 0.9 |
| H-ZSM5/F3 (400° C.) | 2.8 | 2.2 | 1.05 | 1.3 |
| H-ZSM5/F3 (450° C.) | 2.7 | 2.2 | 1.04 | 1.3 |
| H-ZSM5/F3 (500° C.) | 2.2 | 2.3 | 0.62 | 0.8 |
| H-ZSM5/F6 (450° C.) | 4.3 | 1.6 | 0.63 | 0.8 |

(*)no accurate measurement possible, see text.

b) With increasing activation temperature (>325° C.), some ($H^+ \ldots F^-$) were slowly desorbed, resulting in a gradual decrease in the yield of MTBE (FIG. 1).

C) At the activation temperature of 400° C., the reaction of the zeolite surface with the protons of the remaining ($H^+ \ldots F^-$) ion pairs began, resulting in the formation of new hydroxyl groups (FIG. 2).

d) Therefore, the insertion of these HF species into the zeolite framework (H-ZSM5/F3 activated at 450° C.), resulted in: i) more readily available diffusion pathways for the reactant molecules in the zeolite micropores (higher adsorption of methanol, Table 4); ii) higher density of acid sites (Table 4) because of the contribution of these newly formed acidic hydroxyl groups. The breakage of the surface Si—O—Si or Si—O—Al bonds (local events) under the combined effect of the acidic proton (from $H^+ F^-$) and a relatively high temperature, could not be compensated by any global readjustment as in the case of a normal "proton attack". In our case, the loss of some bonds of the zeolite primary units was evidenced by some decrease in the values of the absorbance at the FT-IR wavenumber of 1104 $cm^{-1}$ (from 325° C. to 450° C.). In addition, the presence of F-Al bonds adjacent to some bridged hydroxyl groups (electron-withdrawing effect of F, form $II_a$ of FIG. 2) increased the strength of the latter acidic groups. X-ray diffraction and SET surface area measurement (Table 2), and MAS NMR of $^{27}Al$ of the H-ZSM5/F3 sample activated at 450° C. showed that there was no significant dealumination of the zeolite framework. Thus, the zeolite reached the most favorable "reactant diffusion/acidity" situation at 450° C., resulting in the highest catalytic activity (FIG. 1 and Table 3).

e) Dehydroxylation of the silica or zeolite surface, i.e. loss of hydroxyl groups at high temperature, occurred In our case at an activation temperature higher than 450° C. This phenomenon is known to produce Lewis acid sites in zeolite (Form IV of FIG. 2) at the expense of the Bronsted sites. In fact, when the parent zeolite was heated from 450° C. to 500° C. only, a clear however limited decrease of the values of the B/L and B/(B,L) (B and L stand for bands assigned to Bronsted and Lewis acid sites, respectively ratios determined by means of the FT-IR analysis of adsorbed pyridine, was observed. With the H-ZSM5N3 sample, activated in the same way, there was the following surface rearrangement: i) transfer of $F^-$ (of the F-Al bond of Form $II_a$ of FIG. 2) to the adjacent Si atom (Form III, of FIG. 2 ). This transfer was found to be relatively easy, resulting in a stable Si-F bond; and ii) Formation of an electron deficient Si site(Form $III_b$ of FIG. 2 ) from the Form $II_b$. Form $III_a$ had a configuration similar to the wellknown Lewis acid site in zeolites. Our hypothesis was strongly supported by experimental results of surface acidity (Table 4), the ammonia adsorption and TPD profile and FT-IR study of pyridine adsorption.

The F loading of the H-ZSM5IF3 sample was quite low. The fact that there were no octahedral Al species detected in this fluorinated zeolite when activated at 500° C., indicated that such a Lewis acid configuration did not correspond to a totally extra-lattice Al specier. However, when the F loading was higher than $2.6 \times 10^{-3}$ mol $g^{-1}$ and the activation temperature was at least 450° C., there was removal of some Al atoms by the F species out of the zeolite lattice, probably by formation of fluoroaluminate complexes, $(AlF_n)^{(3-n)}$. The formation of these extrarlattice Al species in the H-ZSM5/F6 sample (with much higher F content than the H-ZSM5F3, Table 4) was evidenced by $^{27}Al$ MAS NMR, X-ray diffraction, BET surface area measurement, and FT-IR studies. As an obvious consequence, this structure degradation was accompanied by a significant decrease in the MTBE yield (Table 3). Nevertheless, if the formation of these extra-lattice Al species was quite limited in number as in our samples, the yield of MTBE still remained much higher than that obtained with the parent zeolite.

Finally, in Table 5 are reported the main physico-chemical properties, pore characteristics and acid density of the desilicated ZSM-5 zeollte (H-DZSM5) and its F modified counterpart, as well as the reference samples including the commercial catalyst AMBERLYST 15™. The catalylic activities of these catalysts are reported in Table 6.

TABLE 5

Pore characteristics, some physico-chemical and surface acidity properties of the desilicated zeolites and the reference samples

| Sample | Si/Al | [Al]* | BET surface area (m²g⁻¹) | RC<sup>&</sup> (%) | Density of acid sites* | $R_{ac/Al}$ |
|---|---|---|---|---|---|---|
| H-DZSM5 | 14.9 | 1.05 | 389 | 86 | 1.05 | 1.0 |
| H-ZSM5/F3 | 20.5 | 0.78 | 370 | 100 | 1.04 | 1.3 |
| H-DZSM5/F3 | 15.0 | 1.06 | 391 | 87 | 1.39 | 1.3 |

*expressed in $10^{-3}$ mol · g$^{-1}$
&referred to the H-ZSM5, as 100% crystalline.

TABLE 6

MTBE yields obtained with the desilicated zeolite catalysts and the reference samples (activation temperature of 250° C. followed by activation at 450° C., except for AMBERLYST 15 ™ brand resin)

| Catalysts | NH₄F loading ($10^{-3}$ mol · g⁻¹) | Content (wt %) | Reaction temp (° C.) | $Y_{MTBE}$ (%) | $Y_{CB}$ (%) |
|---|---|---|---|---|---|
| H-ZSM5 | 0 | 0 | 80 | 34.2 | 0.0 |
| | 0 | 0 | 70 | 30.2 | 0.0 |
| H-DZSM5 | 0 | 0 | 80 | 42.8 | 0.0 |
| | 0 | 0 | 75 | 43.7 | 0.0 |
| | 0 | 0 | 70 | 36.9 | 0.0 |
| H-ZSM5/F3 | 1.87 | 2.7 | 80 | 44.9 | 0.0 |
| | 1.87 | 2.7 | 75 | 39.6 | 0.0 |
| | 1.87 | 2.7 | 70 | 40.9 | 0.0 |
| H-DZSM5/F3 | 1.87 | 3.3 | 80 | 49.9 | 0.0 |
| | 1.87 | 3.3 | 75 | 47.7 | 0.0 |
| | 1.87 | 3.3 | 70 | 48.8 | 0.0 |
| AMBERLYST 15 | 0 | n/a | 70 | 48.1 | 13.4 |
| | 0 | n/a | 80 | 30.0 | 13.9 |

Thus, the fluorination and subsequent activation at 450° C. of the desilicated zeolite did not significantly change its RC and surface area values (Table 5). However, the surface acidity of the resulting catalyst increased by 32% and 78%, respectively, when compared to the desilicated zeolite, H-DZSM5 (Table 5) and the acid form of the parent zeolite, H-ZSM5 (Table 4).

However, the H-DZSM5/F3 catalyst provided a yield of MTBE higher than that of the commercial catalyst AMBERLYST 15™ brand resin, under the same reaction conditions (70–80° C., Table 6). In contrast with the commercial catalyst, no disobutene products were formed with the zeolite catalyst owing to the shape selectivity of the zeolite pore network.

Although the invention has been described above with respect with one specific form, it will be evident to a person skilled in the art that it may be modified and refined in various ways. It is therefore wished to have it understood that the present invention should not be limited in scope, except by the terms of the following claims.

REFERENCES

1. F. Ancillotti, M. M. Mauri and E. Pescarollo, J. Catal. 46 (1977), 49.
2. P. Chu and G. H. Kuhl, Ind. Eng. Chem. Res. 26 (1987), 365.
3. L. M. Tau and B. H. Davis, Appl. Catal. 53 (1989) 263.
4. R. Le Van Mao, R. Carli, H. Ahlafi and V. Ragalni, Catal. Len. 6 (1990), 321.
5. R. Le Van Mao, H. Ahlafi and T. S. Le, in Selectivity in Catalysis, Ed. by M. E. Davis and S. L. Suib, ACS Symp. Ser. 517, Washington DC (1993), 233.
6. R. Le Van Mao, c Catalyst for the synthesis of MTBE , Canadian Patent 2,046,694 (Jan. 23, 1993).
7, Kogelbauer, A. A. Nikolopoulos, J. G. Goodwin Jr. and G. Marcelin, In Zeolites and Related Microporous Materials: State of the Art 1994, ed. by J. Weitkamp, H. C. Karge, H. Pfeifer and W. Holderich, Elsevier Sc. (1994), p 1685.
8. A. A. Nikolopoulos, R. Oukaci, J. G. Goodwin Jr., and G. Marcelin, Catal. Lett. 27 (1994) 149.
9. A. A. Nikolopoulos, A. Kogelbauer, J. G. Goodwin Jr., and G. Marcelin, Catal. Lett. 39 (1996), 173.
10. R. Le Van Mao, S. T. Le, D. Ohayon, F. Caillibot, L. Gelebart and G. Denes, Zeolites 19(1997)270.
11. C. Doremieux-Morin, A. Ramsaran, R. Le Van Mao, P. Batamack, L. Heeribout, V. Semmer, G. Denes and J. Fraissard, Catal. Lett. 34 (1995), 139.
12, N. Y. Topsoe, F. Joensen and E. G. Derouane, J. Catal. 110 (1988), 404.
13. R. Le Van Mao, P. Levesque, C. McLaughlin and L. H. Dao, Appl. Catal. 34 (1987), 163.

I claim:

1. A method of conditioning a ZSM-5 zeolite catalyst material for use in the synthesis of MTBE, analogous ethers, and other acido-catalyzed reactions conducted at temperatures of less than about 450° C., said method comprising the sequential steps of: (I) impregnating an aqueous solution of ammonium fluoride into said parent ZSM-5 zeolite; (ii) drying the resulting material; (iii) activating the resulting material at about 250° C.; and (iv) activating the resulting material at a temperature of about 325° C. or of about 450° C. to about 500° C.

2. The method of claim 1 wherein step (ii) is performed at about 120° C. and until constant weight.

3. The method of claim 1 wherein step (iii) is performed for a period of time of about 3 to about 5 hours.

4. The method of claim 1 wherein step (iv) is performed at a temperature of about 450° C. to about 500° C.

5. The method of claim 1 wherein step (iv) is performed at a temperature of about 450° C.

6. The method of claim 5 wherein step (iv) is performed for a period of time of about 4 to about 24 hours.

7. The method of claim 1 wherein said ZSM-5 zeolite catalyst material consists of desilicated ZSM-5 zeolite materials.

8. The method of claim 1 wherein the concentration of the aqueous solution of ammonium fluoride is about $1.00 \times 10^{-3}$ to about $2.70 \times 10^{-3}$ mol.g⁻¹.

9. The method of claim 8 wherein the concentration of the aqueous solution of ammonium fluoride contain concentrations of about $2.00 \times 10^{-3}$ mol.g⁻¹.

* * * * *